Patented Mar. 20, 1945

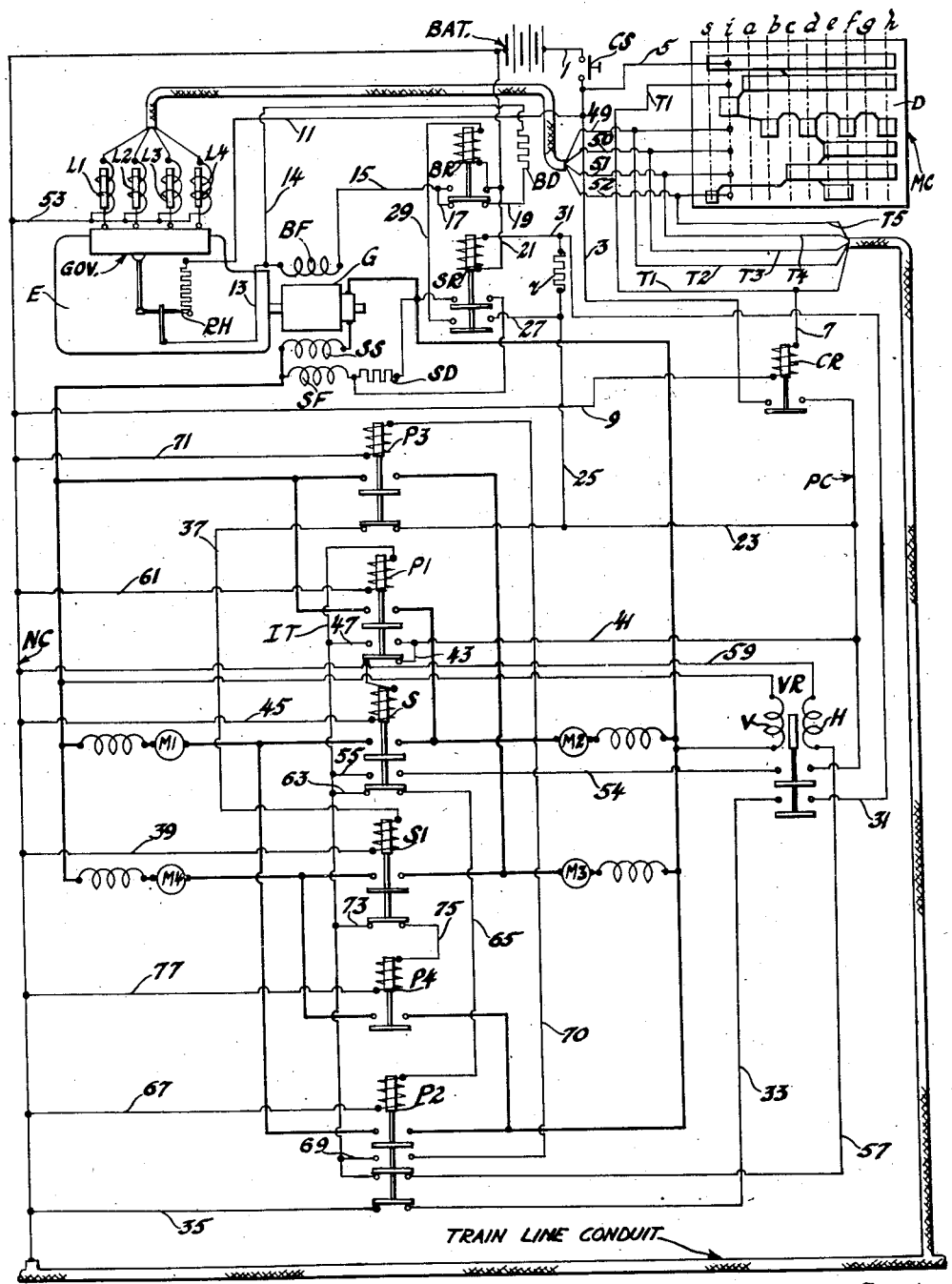

2,371,833

UNITED STATES PATENT OFFICE 2,371,833

GENERATING ELECTRIC TRACTION AND CONTROL SYSTEM

Torsten O. Lillquist, Clarendon Hills, Ill., assignor to General Motors Corporation, Detroit, Mich., a corporation of Delaware Application August 5, 1943, Serial No. 497,424

11 Claims. (Cl. 290—17)

The present invention generally relates to generating electric traction and control systems and more particularly relates to automatic acceleration control means for traction systems of this type.

It has been found necessary to provide automatic acceleration control means for Diesel electric locomotive units operated singly or in multiple in suburban passenger train service to obtain rapid acceleration. Conventional systems of this type, in addition to being complicated and expensive, fail to provide smooth acceleration, due to the fact that it is difficult to control transition of the traction motor connections without causing wide and sudden variations of power in the power circuits and corresponding variations in torque of the traction motors and the generating electric power plant.

The principal object of the present invention is to provide simple automatic control means for a generating electric locomotive unit to cause a gradual change in the traction motor circuit relations with respect to the generator of the power plant and for varying the power output of the generator upon transition of these circuit relations in order to provide smooth and rapid acceleration of the unit and efficient operation of the combined locomotive traction system when operated and controlled as a separate unit or when controlled and operated in multiple with other similar units.

The generating electric traction and control system by which the above object is accomplished together with other novel features thereof will become apparent by reference to the following detailed description and single drawing illustrating a system which is particularly adapted for use on rapid transit locomotives.

The single drawing shows in diagrammatic form, a traction and control system for a locomotive unit which may be controlled and operated separately or in multiple with other similar units.

Referring now to the drawing, the traction system comprises a plurality of series type, electric traction motors M1, M2, M3 and M4, which are operatively connected to the traction wheels of the locomotive, not shown, in conventional manner, and a power plant including a Diesel engine E and an electric generator G driven thereby.

The traction motors together with series and parallel electric contactors, indicated at S, S1, P1, P2, P3 and P4, are connected by power conductors, shown in heavy lines in the drawing with the generator. Each contactor is provided with pairs of fixed contacts, an armature having contacts movable into and out of contact with the fixed contacts, and an electro-magnetic winding for moving the armature upwardly from the normal position, as shown, upon energization of the winding. The upper fixed contacts of each of the contactors are power contacts. The power contacts are connected to the power conductors in such manner that upon closure of the power contacts of the series contactors S and S1, pairs of motors are connected in series across the generator or in series-parallel circuit relation with the generator G or upon closure of contacts of the parallel contactors P1, P2, P3 and P4, each of the motors are connected across the generator or in parallel circuit relation with the generators. The lower pairs of fixed contacts on the contactors are interlocking and control contacts. The interlocking and control contacts and the contactor windings are connected by interlocking and control circuit connections, shown in lighter lines on the drawing, with power plant control means, a manually operable controller MC and electro-responsive control means VR so that starting and initial acceleration of the locomotive is controlled by the master controller which renders the electro-responsive means operative to control sequential operation of the contactors and power plant control means, whereby further smooth and rapid acceleration of the locomotive takes place automatically.

The voltage responsive control means provided, is a voltage control relay VR. This relay is provided with two pairs of fixed contacts, a pair of armature contacts and a voltage winding V for moving the armature contacts into contact with the fixed contacts. A holding winding H is also provided on the relay VR, which is included in an interlocking circuit, to be described later.

The power plant control means includes a governor GOV, of any well known type, which is driven by the engine E and which acts in response to slight variations in the engine speed to vary the fuel supply to the engine and to also adjust a generator field rheostat RH thereby to cause operation of the power plant at constant values of speed, load and power output in a well known manner. The governor GOV includes conventional speed setting means, not shown, to vary the speed response of the governor GOV. A plurality of electro-magnetically actuated plungers L1, L2, L3 and L4 are operatively connected to the governor speed setting means in a well known manner so that when all of the plunger windings are deenergized the power plant is caused to operate at idling speed and no load, and when the windings are energized separately and in various combinations the power plant is caused to operate at any one of a plurality of preselected constant values of speed, load and output, and when only the winding of the plunger L4 is energized the power plant is shut down or stopped.

The generator is provided with series, shunt and battery excited excitation circuits. The series excitation circuit includes the series field winding SS. The battery excited circuit includes the rheostat RH, a field winding BF, a discharge resistor BD, therefor, and a control relay BR. The relay BR is provided with two pairs of fixed contacts, a pair of armature contacts and a relay winding which, when energized, causes the opening of the lower pair of contacts and closure of the upper pair. Control and interlocking connections, to be described, are connected between the relay BR, rheostat RH, field winding BF, discharge resistor BD and a battery BAT so that, upon energization of the winding of the relay BR, the rheostat RH, and field winding BF are connected across the battery BAT and upon deenergization of the relay winding, the rheostat RH and winding BF are disconnected from the battery and the discharge resistor BF is connected across the field winding BF to cause prompt discharge of the field winding and a drastic reduction in the generator power output to the traction motors.

The generator shunt field winding includes a shunt field winding SF, a discharge resistor SD, therefor, and a control relay SR. The relay SR is provided with two pairs of fixed contacts, a pair of armature contacts and a relay winding which, when energized, causes closure of the fixed contacts by the armature contact. The field winding SF and discharge resistor SD are shown connected in series across the generator to also cause a prompt discharge of this field winding. The upper fixed contacts of the relay SR are connected across the resistor SD so that it will be shunted when these contacts are closed to cause an increase in the excitation current of the shunt field winding SF and a corresponding increase in the generator power output. It will be evident that the generator output will be suddenly and drastically decreased when the battery and shunt field windings are discharged. The lower fixed contacts of the relay SR, as will be described, are connected to the winding of the relay BR to control energization thereof when these contacts are closed. The opening of the lower contacts of the relay SR will accordingly cause prompt discharge of the generator shunt and battery excited excitation circuits which causes a prompt decrease in the output of the generator to a negligible value.

A control relay CR is provided to control simultaneous energization of the windings of the relay SR and contactors S and S1 in order to cause excitation of the generator G and connection of the motors in series parallel relation with the generator. The relay SR is provided with a pair of fixed contacts, an armature contact and a winding which, when energized, causes closure of the relay contacts. Energization and deenergization of the winding of the relay is controlled by a manually operable master controller MC which also controls energization of the electromagnetic windings of the plungers L1 to L4 in order to control the speed, load and output of the prime mover.

The master controller MC is provided with a plurality of fixed contacts and a manually movable drum D on which electrically interconnected contacts are secured. The contacts on the drum D are movable into contact with the fixed contacts in a preselected sequence and combination, to be described, in order to cause operation of the power plant at idling speed and no load when the drum is in the idle position i, in which it is shown, and to cause the power plant to be shut down or stopped when the drum is moved to the stop position s, and to cause operation of the power plant at idle speed and minimum output and energization and closure of series contacts S and S1 in order to connect the traction motors in series-parallel circuit relation with the generator G when the controller drum is in position a; and to cause an increase in the speed, load and power output of the generator with the motors connected in series-parallel circuit relation therewith when the controller drum is moved successively from position b to h in order to cause starting and initial acceleration of the locomotive.

The control and interlocking connections together with suitable train line connections whereby one or more locomotive units may be controlled from one master controller will now be described in detail.

The negative battery terminal is connected to a negative control and train line conductor NC, shown entering a train line conduit. The positive battery terminal is connected to a positive control conductor PC by conductors 1 and 3 through the contacts of a manually operable control switch CS and the control relay CR. A conductor 5 is connected between the conductor 3 and the upper fixed contact of the master controller MC and the fixed controller contact, second from the top, is connected to a train line conductor T1 which is also shown extending into the train line conduit. One terminal of the winding of the control relay CR is connected by a conductor 7 to the train line conductor T1 and the opposite terminal of the relay winding is connected by a conductor 9 directly to the negative control conductor. With the controller drum contacts arranged, as shown, the two upper fixed controller contacts are bridged when the drum is moved between control positions a and h so that when the control switch CS is closed and the controller drum D is in position a the winding of the control relay CR is energized through these contacts of the controller and switch and conductors 7 and 9 to cause closure of the relay contacts. When the relay contacts are closed the positive control conductor PC is connected to the positive battery terminal through the conductors 1 and 3. A conductor 11 is connected between the conductor 1 and one terminal of the rheostat RH and the other terminal is connected by conductors 13 and 14 to one terminal of the generator field winding BF and one terminal of a discharge resistor BD. The opposite terminal of the field winding is connected by conductors 15 and 17 to the left upper and lower fixed contacts of the relay BR. The right lower relay contact is connected by a conductor 19 to the other terminal of the discharge resistor BD and the upper right contact and lower winding terminal of the relay BR and also the lower winding terminal of the relay SR are connected by a conductor 21 to negative control conductor NC. With the above connection arrangement the discharge resistor BD is normally connected in shunt relation with the field winding BF through the normally closed lower contacts of the relay BR. The upper winding terminal of the relay BR is connected to the positive control conductor PC through the lower fixed control contacts of the relay SR by conductors 23, 25, 27 and 29 and a current limiting resistor r is connected in series between the conductor 25 and the upper winding terminal of the relay SR by a conductor 31. It will be evident that with the above described connections, closure of the contacts of the control relay CR causes energization of the winding of the relay SR and closure of its contacts. Closure of the upper contacts of the relay SR causes shunting of the discharge resistor SD and closure of the lower contacts causes the winding of the relay BR to be energized, which causes the closure of the upper contacts thereof and the opening of the lower contacts to connect the rheostat RH and battery field winding BF to the battery BAT and to disconnect the discharge resistor BD therefrom. The battery and shunt generator field windings are accordingly energized, by connection of battery BAT to the rheostat RH and field BF through conductors 1, 3, 11, 13, 15 and 21 and by the shunting of the discharge resistor SD out of the shunt field circuit.

The conductor 31 is also connected to one of the normally open lower fixed contacts of the voltage relay VR and the other lower relay contact is connected through the normally closed pair of lower interlocking contacts of the parallel contactor P2 to the negative control conductor NC by conductors 33 and 35. It will, therefore, be apparent that, when the lower contacts of the voltage relay VR and lower interlocking contacts of the contactor P2 are closed, the winding of the relay SR will be shunted through these contacts and the conductors 31, 33 and 35 to cause its armature to drop to the normal position, as shown, to cause deenergization of the winding of the relay BR which causes its armature to drop to the position shown. When the armature contacts of the relays SR and BR are in the positions shown the battery field winding BF is disconnected from the battery BAT and connected in shunt circuit relation with the discharge resistor BD and the discharge resistor SD is connected in series with the generator shunt field winding SF in order to cause a prompt discharge of both of these excitation windings which causes a sudden and drastic reduction in the generator power output to the traction motors. The resistance values of the discharge resistors BD and SD are such that when they are connected in these excitation circuits the generator power output is promptly reduced to substantially zero.

The windings of each of the series contactors are also energized, by means of the following connections, to cause the traction motors to be connected in series-parallel relation to the generator G when the controller is moved to position a. With the controller in position a the power plant is operating at idling speed and low output and there is not sufficient power supplied to the traction motors to cause starting of the locomotive. The winding of the series contactor S1 is connected between the positive and negative control conductors PC and NC through the normally closed interlocking contacts of the parallel relay P3 and the conductors 23 and 37 and 39, which causes energization of the winding of the contactor S1, closure of the power contacts, and the opening of the lower pair of interlocking contacts thereof. Closure of the power contacts of the contactor S1 causes the motors M3 and M4 to be connected in series across the generator G. The winding of the series contactor S is connected between the positive and negative control conductors through the normally closed lower interlocking contacts of the parallel contactor P1 and the conductors 41, 43 and 45 to cause energization of its winding and closure of the power contacts and upper pair of interlocking contacts, and the opening of the lower pair of interlocking contacts. Closure of the power contacts of the contactor S causes the motors M1 and M2 to be also connected in series across the generator, and hence each pair of motors is connected in series across the generator. It will be noted that the conductors 41 and 43 are connected between the positive control conductor and the right upper and lower interlocking contacts of the contactor P1, the lower left contact, of which is connected directly to one terminal of the winding of the contactor S, the other terminal of which is connected by the conductor 45 to the negative control conductor NC. The upper left interlocking contact of the contactor P1 is connected by a conductor 47 to an interlocking conductor IT, which will be referred to later.

The four lower fixed contacts of the master controller are separately connected by conductors 49, 50, 51 and 52 to respective upper terminals of the electro-magnet windings of the plungers L1 to L4 for actuating the governor speed setting means. The lower terminals of these windings are connected by a conductor 53 to the negative control and train line conductor NC. A train line conductor is connected between each of the conductors 49, 50, 51 and 52. These train line conductors are indicated at T2, T3, T4 and T5 and are also shown extending into the train line conduit. With the arrangement of the contacts on the controller drum illustrated when the drum D is in the idle position i or position a none of the lower fixed controller contacts are contacted by drum contacts and therefore all of the plunger windings are deenergized to cause operation of the power plant at idling speed and minimum output. When the controller drum is moved to the stop position s the lower fixed contact of the controller is contacted by a drum contact to cause energization of the winding of the plunger L4 which causes the power plant to be stopped or shut down. When the controller drum is moved successively from position b to position h the lower fixed contacts of the controller are contacted separately and in combination to cause corresponding energization of the windings of the plunger which causes a successive increase in the speed load and power output of the power plant to the traction motors which are then connected in series-parallel circuit relation with the generator G of the power plant so that starting and initial acceleration of the locomotive takes place. The increase in speed of the tractor motors causes a rise in the C. E. M. F. of the motors and the generator voltage and, upon a preselected rise in generator voltage, the pull exerted by the voltage coil V of the voltage relay, which is connected across the generator, causes the closure of the relay contacts. This action of the voltage relay causes the following preselected sequence of operation of the series and parallel contactors and momentary deenergization of the generator field windings so that a gradual preselected change in the motor connections takes place automatically to cause further smooth and rapid acceleration of the locomotive. The control and interlocking connections by which this automatic change takes place will now be described.

As has been previously described, when the lower pair of contacts of the relay VR close, the winding of the relay SR is shunted through the closed lower contacts of the relay VR and lower interlocking contacts of the contactor P2, and conductors 31, 33 and 35 to cause the armature of the relay SR to fall to the position shown. This causes the discharge resistor SD to be connected in series with the generator shunt field winding SF and also cause deenergization of the winding of the relay BR which causes its armature to fall to the position shown, so that the generator field winding BF and rheostat RH are disconnected from the battery BAT and the discharge resistor BD is connected in shunt circuit relation with the field winding BF. As explained, this causes the generator output to be promptly reduced to substantially zero. This reduction in generator output and voltage would cause reopening of the contacts of the voltage relay and in order to prevent this, the holding winding H of the relay is connected in a holding circuit which includes the then closed upper contacts of the relay VR and upper interlocking contacts of the series contactor S, and also the normally closed central pair of interlocking contacts of the contactor P2. These contacts are connected in series relation with the holding winding H of the voltage relay between the positive and negative control conductors by conductors 54, 55, the interlocking conductor IT and conductors 57 and 59 respectively. The interlocking conductor IT is also connected directly to one winding terminal of the parallel contactor P1 and the other winding terminal is connected by a conductor 61 to the negative control conductor NC so that this winding is energized to cause closure of the power contacts and upper interlocking contacts and the opening of the lower interlocking contacts of the parallel contactor P1. The power contacts of this contactor are shown connected by power conductors which are connected between one terminal of the motor M1 and the common power connection between this motor and the motor M2, which is completed through the closed power contacts of the series contactor S, so that the motor M1 is shunted and the motor M2 is connected directly across the generator G when the power contacts of the contactors S and P1 are closed. Closure of the upper interlocking contacts of the contactor P1 completes a circuit through conductors 41 and 47 to the interlocking conductor IT from the positive control conductor PC and the opening of the lower interlocking contacts of the contactor P1 opens the energizing connection to the winding of the series contactor S to cause the opening of the power contacts and upper interlocking contacts thereof and closure of the lower interlocking contacts. The opening of the power contacts of the contactor S opens the common power connection between the motors M1 and M2 so that the motor M1, which was shunted, is now disconnected from the generator G. The opening of the upper interlocking contacts of the contactor S opens the initially established energizing circuit through these contacts and conductors 54 and 55 to the interlocking conductor IT. Closure of the lower interlocking contacts, which are shown connected by conductors 63 and 65 between the conductor IT and one terminal of the winding of the contactor P2 and as the other winding terminal is connected by a conductor 67 to the negative control conductor; this winding is energized which causes closure of the power contacts and upper interlocking contacts and the opening of the central and lower interlocking contacts of the contactors P2. The closure of the power contacts of the contactor P2 caused the motor M1 to then be connected across the generator so that each of the motors M1 and M2 are now connected in parallel with the generator and the motors M3 and M4 are still connected in series across the generator. The opening of the central interlocking contacts of the contactor P2 opens the previously described holding circuit to the holding winding H of the voltage relay to cause the opening of both pairs of contacts thereof. The opening of the lower interlocking contacts of the contactor P2 and the lower contacts of the voltage relay VR opens the shunting circuit for the winding of the relay SR, which causes reenergization of the windings of the relays SR and BR to cause an increase in the generator excitation and output to the original value. Closing of the upper interlocking contacts of the contactor P2, which are connected by conductors 69 and 70 between the conductor IT and one terminal of the winding of the contactor P3, the other terminal of which is connected by a conductor 71 to the negative control conductor NC, causes energization of this winding and closure of the power contacts and the opening of the interlocking contacts of the contactor P3. Closure of the power contacts of the contactor P3, which are shown connected by power conductors between one terminal of the motor M4 and the common power connection between the motors M3 and M4, which is completed through the closed power contacts of the contactor S1, causes shunting of the motor M4 and connection of the motor M3 across the generator when the power contacts of the contactors P3 and S1 are closed. The opening of the interlocking contacts of the contactor P3 opens the energizing circuit comprising conductors 23 and 37 to the winding of the series contactor S1 to cause the opening of the power contacts and closure of the interlocking contacts thereof. The opening of the power contacts of the contactor S1 opens the common power connection between motors M3 and M4 thereby causing the motor M4 to be disconnected from the generator. The closing of the interlocking contacts of the contactor S1, shown connected by conductors 73 and 75 between the interlocking trunk conductor IT and one winding terminal of the contactor P4, the other terminal of which is connected by a conductor 77 to the negative battery terminal causes energization of the winding and closure of the power contacts of the contactor P4 so that the motor M4 is then also connected parallel with the generator.

The above described traction and control system permits excitation of the power plant generator and an increase in the power output of the generator to pairs of motors connected in series across the generator by operation of the master controller in order to control starting and initial acceleration of the locomotive unit. The voltage relay then acts automatically in response to an increase in the generator voltage as the speed of the locomotive increases to cause a momentary and drastic reduction in the generator power output to the motors and a gradual change in the motor connections in order to cause smooth and rapid acceleration of the locomotive unit up to the maximum value of speed in the following sequence:

The generator output to the traction motors is decreased and one motor of a pair of motors which are connected in series across the generator is shunted and the other motor of this pair is connected across the generator, the shunted motor is next disconnected from the generator and then connected across the generator, after which, the power output of the generator is increased to its original value; then one motor of the other pair, connected in series across the generator, is shunted and the other motor of this pair is connected across the generator; the shunted motor is next disconnected from the generator and then connected directly across the generator. It will be evident that the generator excitation and power output is reduced to substantially zero prior to the change in connections of one pair of motors and then increased to the original value prior to the change in connections of the other pair of motors. It has been found that the above changes in generator output and traction motor connections causes smooth and rapid acceleration of the locomotive unit, and by providing train line connections a plurality of similar units may be controlled and efficiently operated in multiple in suburban passenger train service.

I claim:

1. A traction and control system for a generating electric locomotive comprising a plurality of traction motors for driving individual wheels of said locomotive, a generating electric power plant for supplying power to said motors, motor power connections including connection changing means for causing a preselected gradual change in the motor connections from a starting connection, in which a plurality of groups of motors are connected in parallel with the power plant, with the motors in each group connected in series, to a high speed running connection by causing one motor at a time to be connected in parallel with said power plant until all of the said motors are connected in parallel with said power plant, and voltage means acting in response to a preselected value of motor starting speed for controlling said motor circuit changing means.

2. A locomotive generating electric traction and control system comprising a plurality of traction motors, a generating electric power plant supplying power to said motors, means for reducing the power output of said power plant, motor power connections including switching means operable in sequence and in combination for causing a change in the connections of one motor at a time whereby the motor power connections are gradually changed from a series-parallel to a parallel circuit relation with respect to said power plant and said power output reducing means is rendered operative upon change of certain of said motor connections to the parallel circuit relation, and control means acting in response to a preselected value of voltage supplied to said motors when connected in series-parallel relation with said power plant to control operation and said switching means in order to cause a smooth and rapid change in the speed of said motors.

3. A traction and control system of the type described comprising a plurality of traction motors, a generating electric power plant, power connections including a plurality of switching means between said motors and said power plant, output regulating means for said power plant, control means for said switching means and said output regulating means, said control means comprising means operable for causing groups of said motors to be connected in series across said power plant and for increasing the output of said power plant in order to cause starting of said locomotive, and means acting automatically in response to an increase in voltage of said power plant for causing operation of said switching means and said output regulating means in sequence whereby the power plant output is reduced and the individual motors of one group are connected across said power plant one at a time after which the output of the power plant is increased to its original value and the individual motors of another group are connected across the power plant one at a time.

4. A locomotive traction and control system of the type described comprising a generator and engine power plant, a plurality of traction motors, power connections between said generator and motors, connection changing means included in said power connections for connecting groups of said motors in series across said generator or for causing the individual motors of each group to be connected across the generator one at a time, output regulating means for said power plant, a manually operable controller for controlling said connection changing means and said output regulating means to cause starting of said locomotive with the motors in each group connected in series with said generator, and means acting in response to an increase in the generator voltage upon an increased speed of the motors for controlling said connection changing means and said power plant output regulating means to cause a drastic reduction in the output prior to the changing of the connections of the motors and for causing an increase in the output after certain of said motor connections are changed in order to cause further smooth acceleration of the locomotive.

5. A generating electric traction and control system comprising a plurality of traction motors, a generating electric power plant including a prime mover and an electrical generator driven thereby for supplying power to said motors, power plant speed, load and output regulating means, motor power connections including a plurality of switching means, control means for said power plant control means and said switching means, said control means comprising manually operable control means for causing groups of said motors to be connected in series across said generator and for causing variation in the speed, load and output of said power plant in order to cause smooth initial acceleration of the motors, and automatic control means acting upon initial increase in the generator voltage and initial acceleration of said motors for causing sequential operation of said output reducing means and said switching means whereby the output is reduced to a low value and the individual motors of one group are connected across said generator one at a time after which the output is increased to the original value and the individual motors of another group are then connected across said generator one at a time.

6. A traction and control system for a generating electric locomotive comprising a plurality of traction motors, a power plant supplying power thereto, said power plant comprising an engine and a generator driven thereby, speed, load and output varying means for said power plant, motor power connections including a plurality of interlocked electro-responsive switching means operable simultaneously in one combination for connecting pairs of said motors in parallel with said generator, the motors of each pair then being connected in series, or operable in sequence and combination for connecting one motor at a time of one pair at a time in parallel with said generator, separate electro-responsive switching means for causing a drastic reduction in the power output of said power plant, control and interlocking connections between said various electro-responsive switching means, said interlocking and control connections including a manual controller for controlling both of said switching means for simultaneously causing pairs of said motors to be connected in parallel with said generator and for controlling the power plant speed, load and output of said power plant to cause starting of said locomotive, and control means acting automatically in response to an increase in the generator voltage upon initial acceleration of said motors to control sequential operation of said various electro-responsive switching means in order to cause a momentary, drastic reduction in the power output of said power plant and to cause each motor of each pair of motors to be connected in parallel with said generator one at a time in order to cause further smooth and rapid acceleration of said locomotive.

7. A traction and control system for a locomotive comprising a power plant including an engine and an electric generator driven thereby, electro-responsive speed, load and output regulating means for said power plant including electro-responsive relay means for controlling certain of said regulating means, a plurality of electric traction motors for driving the locomotive wheels, motor power connections including electro-responsive contactors, said contactors being operable in combination to cause said motors to be connected in series-parallel circuit relation with said generator to cause starting of said locomotive or operable in combination and sequence to cause a gradual change in the motor power connections from a series-parallel to a parallel circuit relation by shunting of certain of said motors and by connecting one motor at a time in parallel with said generator, train line, interlocking and control connections including a control relay interconnecting said electro-responsive relay means and contactors, a master controller connected by train line connections to said control relay and said electro-responsive power plant, speed, load and output regulating means for causing energization thereof to cause establishment of said motor starting connection and an increase in the speed, load and output of the power plant, said train line connections adapted to be connected to similar control means of other locomotives for multiple control by said master controller, and generator voltage responsive means included in said interlocking and control connections and operable upon an increase in the speed of said motors for causing combined and sequential operation of said electro-responsive control relays and contactors whereby a gradual change from the series-parallel to the parallel motor circuit relation takes place automatically accompanied by a drastic momentary decrease in the power plant output during said change in circuit relations in order to cause further smooth and rapid acceleration of said locomotive.

8. A traction and control system of the type described comprising a power plant including an electric generator and an engine driving said generator, a plurality of traction motors supplied with power from said power plant for driving said locomotive; speed, load and output regulating means for said power plant including relay means for rendering said output means operative and inoperative, motor power connections including a plurality of motor connection changing contactors operable in combination to cause pairs of motors to be connected in series across said generator or operable in combination and sequence to change said motor connections one at a time until all are connected across said generator, interlocking and control connections between said relay means and said contactors, a control relay and a master controller included in said interlocking and control connections in proper manner to cause simultaneous operation of said relays and contactors to permit regulation of said power output regulating means and to cause operation of said contactors whereby pairs of said motors are connected in series across said generator upon operation of said controller to cause starting and initial acceleration of said locomotive, and generator voltage responsive means also included in said interlocking and control connections for controlling sequential operation of said relay and said contactors whereby the generator output is automatically reduced while certain of the motors are being connected across said generator.

9. An electric traction and control system for a locomotive comprising a plurality of traction motors, a locomotive power source, means for reducing the power output of said power source, power connections between said power source and said motors, switching means for said motors and output reducing means adapted to act in combination and sequence to cause the connections of one motor at a time to be changed and to also cause said power output reducing means to be rendered operative upon change in certain of the motor connections so that the motor power connections are gradually changed from a series-parallel to a parallel circuit relation with respect to said power source, and means acting in response to a preselected value of voltage supplied to said motors when connected in series-parallel relation with said power source for controlling operation of said switching means.

10. An electric traction and control system for a locomotive comprising a plurality of traction motors, a locomotive power source for said motors, said power source including means for reducing the power output of said power source, power connections between said motors and power source including switching means, said switching means being adapted to act in combination to cause the establishment of a series-parallel motor power circuit relation with said power source and to act also in sequence and in combination for causing one motor at a time to be connected in parallel circuit relation with said power source by causing certain of the motors to be shunted and for causing said output reducing means to be rendered operative upon change in certain of the motor connections so that a motor parallel power circuit relation is established gradually thereby causing smooth and rapid acceleration of the locomotive, and automatic control means acting in response to a preselected electrical condition in the series-parallel motor circuit relation for controlling operation of said switching means in the manner described for causing gradual establishment of the parallel motor circuit relation.

11. An electric traction and control system for a locomotive comprising a plurality of traction motors driving individual locomotive axles, a locomotive generating electric power source for said motors, means for regulating the power output of said power source, switching means adapted to act in combination to cause establishment of a series-parallel motor starting connection and for rendering said output regulating means operative, manual control means for controlling said combined action of said switching means and for controlling said output regulating means, said switching means being also adapted to act in sequence and in combination to cause one motor at a time to be connected in parallel running circuit relation with said power source by causing shunting of certain of said motors and also for rendering inoperative a portion of said output regulating means to cause a reduction in the power output upon a change of certain of said motors to the parallel circuit relation in order to cause smooth and rapid acceleration of the locomotive, and automatic means acting in response to a preselected electrical condition in the series-parallel motor circuit relation for controlling said switching means independently of said manual control means to cause one motor at a time to be connected in parallel circuit relation with said power source and the power output of said power source to be reduced upon a change in certain of said motor connections by the shunting of certain other of said motors.

TORSTEN O. LILLQUIST.